Patented Dec. 22, 1936

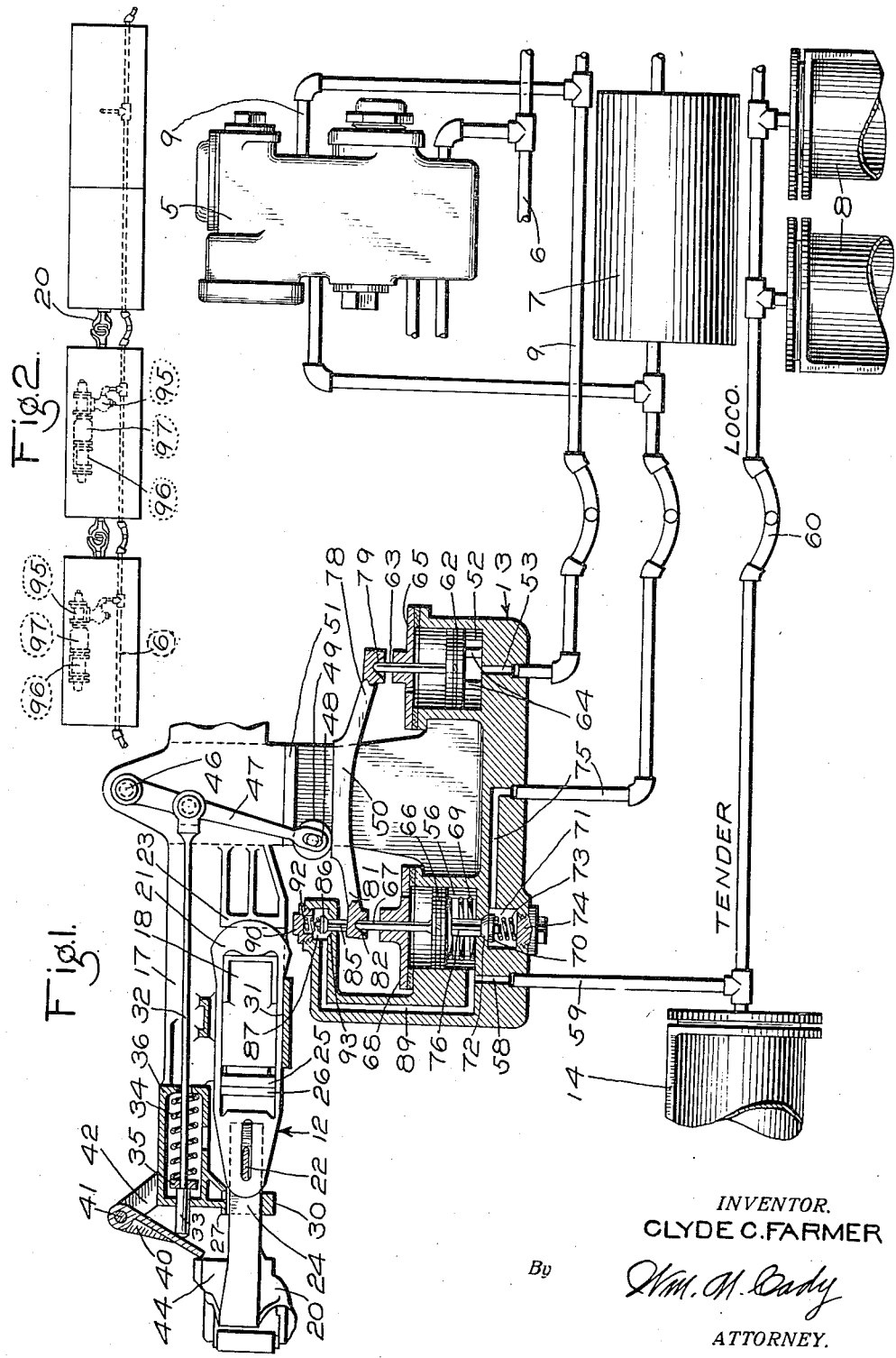

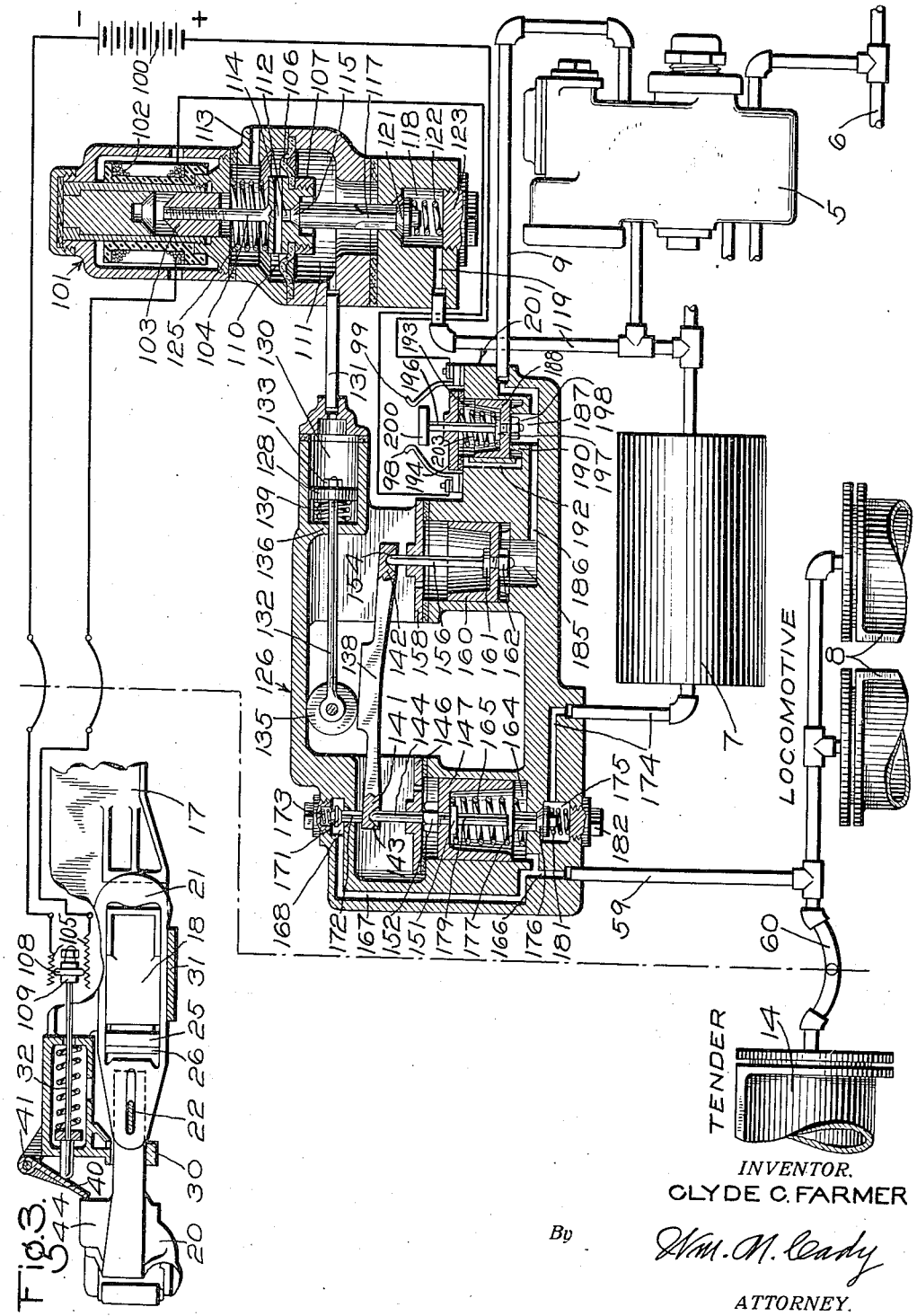

2,065,216

UNITED STATES PATENT OFFICE 2,065,216

FLUID PRESSURE BRAKE

Clyde C. Farmer, Pittsburgh, Pa., assignor to The Westinghouse Air Brake Company, Wilmerding, Pa., a corporation of Pennsylvania Application September 21, 1935, Serial No. 41,511

12 Claims. (Cl. 303—18)

This invention relates to brake systems for trains and more particularly to a fluid pressure brake system adapted for the handling of long trains.

It is well known that, in the handling of long trains, a reduction in brake pipe pressure initiated through operation of the engineer's brake valve on the locomotive will cause the brakes to apply serially throughout the train, the brakes on the locomotive and on the forward cars near the locomotive being first applied, and the brakes on remote cars responding progressively according to the distance from the locomotive. As a result of this serial braking action, the retardation of the locomotive and cars at the front end of the train begins before the brakes on the cars at the rear end become effective.

The usual coupling mechanisms between the adjacent cars of a train are adapted to permit a certain amount of slack action or lost motion, which is generally stretched out at the time an application of the brakes is initiated, and since, as above explained, the locomotive and forward cars begin to decelerate, upon an application of the brakes, before the cars at the rear of the train, the latter tend to run in on the slower moving cars, gathering in the slack. If the slack action is harsh, violent shocks may result, causing damage to cars and lading.

A primary factor in harsh slack action is apt to be the effect of the relatively heavy locomotive, which on the one hand, if decelerated too much in advance of the rest of the train, forms an unyielding abutment for the rear cars of the train to run against, and on the other hand, if insufficiently decelerated, tends to drag forward with undesired force.

The principal object of my invention is to provide a fluid pressure brake system for a train, which, in functioning to effect an application of the brakes, will insure the stopping of the train in such a manner as to obviate the above difficulties.

Another object of my invention is to provide a brake system for a train which operates automatically to control the application of the brakes on the locomotive while the car brakes are applying, according to the slack action between the locomotive and a car connected thereto.

In the accompanying drawings, Fig. 1 is a diagrammatic view, partly in section, of the coupling mechanism of a locomotive tender and a portion of the brake system of the tender and locomotive, embodying one form of my invention; Fig. 2 is a diagrammatic view of a train comprising a locomotive and tender and two cars, only a portion of the brake system being shown; and Fig. 3 is a diagrammatic view, partly in section, of brake equipment similar to that shown in Fig. 1, but embodying a modified form of my invention.

As shown in Fig. 1 of the drawings, the locomotive equipment comprises a distributing valve device 5 for controlling the application and release of the brakes on the locomotive, such as that employed in the well known E. T. locomotive brake equipment, a brake pipe 6, a main reservoir 7, and brake cylinders 8. The tender equipment includes a coupling mechanism 12, a control valve device 13, and a brake cylinder 14.

The distributing valve device 5 may be of the usual type, shown only in outline in the drawings but comprising an equalizing portion connected to the brake pipe 6 and an application portion. The equalizing portion is adapted to operate upon a reduction in the pressure of fluid in brake pipe 6 for actuating the application portion, thereby causing the latter to supply fluid under pressure directly from the main reservoir 7 to a supply pipe 9, and is adapted to operate upon a subsequent increase in fluid pressure in brake pipe 6 for causing said application portion to vent the pipe 9 to atmosphere.

On the tender, the coupling mechanism 12 is carried by the usual center or draft sills 17 of the tender, and comprises a shock absorbing mechanism 18 and a coupler 20, the latter having its inner end or shank 24 operatively connected with the shock absorbing mechanism through the medium of a draft yoke 21 and a transversely disposed draft key 22, the yoke surrounding the shock absorbing mechanism and the key extending through horizontal slots formed in the draft sills and coupler shank. The rear end of the shock absorbing mechanism 18 is adapted to abut the rear stop lugs 23 on the draft sills, and the forward end abuts a follower plate 25 which in turn is adapted to abut front stop lugs 26. It should be understood that when the draft rigging is released, the coupler shank 24 is maintained in engagement with the follower plate 25 by suitable spring means (not shown).

At the end of the tender a striking plate 27 is provided, and below the striking plate and carried by the draft sills is the usual carry-iron 30 which supports the coupler shank and thereby the coupler 20. The draft yoke 21 and shock absorbing mechanism are supported in the usual manner by a horizontally disposed plate 31 which is secured at its ends to the bottom flanges of the sills.

Mounted horizontally on the draft sills 17 above the coupling mechanism 12 is an operating rod 32 having a plunger 33 at one end adapted to extend through a suitable bore in the striking plate. A spring 34, interposed between a collar 35 on the rod and an abutment portion 36 on the draft sills, acts to maintain the plunger end 33 in operative engagement with a member 40, which is pivotally suspended from a pin 41 carried by rearwardly extending lug portions 42 of the draft sills. The lower end of member 40 operatively engages the rear face of a horn portion 44 of coupler 20, so that longitudinal movement of the coupler is transmitted by said member to the operating rod 32.

Suspended in a substantially vertical position from a fixed pivot pin 46 is a lever 47, which is pivotally joined intermediate its ends to the end of rod 32 opposite the plunger 33, and carries pivotally mounted in a slot 48 at its lower end a roller 49, which is disposed between a plate 51 secured to the control valve device 13 and a bearing face of a movable fulcrum plate 50 of said control valve device.

According to my invention, the control valve device 13 comprises a casing which contains a piston 62 having at one side a chamber 52, which is connected through a passage 53 to the supply pipe 9, and a similar piston 66 having at one side a chamber 56, connected through a passage 58 to a brake cylinder pipe 59 leading to the brake cylinder 14 and, by way of a flexible hose coupling 60, to brake cylinders 8 on the locomotive.

The piston 62 has a stem 63 extending through a suitable bore in a perforate cap plate 65, which is provided for closing the outer end of the bore containing said piston. Stop lugs 64 are provided in the chamber 52 for limiting downward movement of the piston 62.

The piston 66 has a stem 67 extending through a suitable bore in a perforate cap plate 68, which closes the outer end of the piston bore, and a spring 69 is disposed in chamber 56 between the piston 66 and the bottom wall of said chamber for urging said piston upwardly. A supply valve 70 which is contained in a valve chamber 71 connected through a passage and pipe 75 to the main reservoir 7 on the locomotive, is provided for controlling communication between said chamber and the chamber 56, and is urged into engagement with a seat 72, formed on the wall separating said valve chamber from chamber 56, by the pressure of a spring 73 provided between the valve and a cap nut 74. The supply valve 70 has a fluted stem 76 extending into the chamber 56 and normally spaced from the lower side of piston 66, which is adapted operatively to engage the end of said stem for controlling the supply valve.

The balance plate 50 of the control valve device comprises oppositely extending arms 78 and 81, equally spaced from the central portion. The lower face of arm 78 has a recess 79 which is adapted operatively to receive the end of the piston stem 63, and similarly, the lower face of arm 81 has a recess 82 adapted operatively to receive the end of the piston stem 67.

The upper face of the arm 81 operatively engages the end of a fluted stem 85 of a release valve 86, aligned with piston 66 and stem 67 and contained in a valve chamber 87, which is connected through a passage 89 to the chamber 56.

The outer end of the valve chamber 87 is closed by a cap nut 90, and a spring 92 is disposed between the valve 86 and the cap nut for urging said valve downwardly, said valve being adapted to engage a seat 93 formed in the lower wall of valve chamber 87.

It should be understood that the valve stems 85 and 76 are of such lengths that either one of valves 86 and 70, respectively, will be seated while the other is unseated depending upon the positioning of the piston 66 and its stem 67.

Any desired type of brake equipment may be used on each car of the train. For illustrative purposes, I have shown in outline in Fig. 2, each car equipped with the ordinary type of fluid pressure brake which comprises a brake pipe 6, a triple valve device 95, a brake cylinder 96, and an auxiliary reservoir 97. The coupler 20 at the rear end of the tender is coupled to the front coupler of the first car of a train of coupled cars, as shown in the drawings, and the brake pipes of the locomotive, tender, and cars are connected by the usual hose couplings so as to form, in effect, a continuous brake pipe from end to end of the train.

In operation, with the brake system in release position, fluid under pressure supplied to the main reservoir 7 in the usual manner flows through pipe and passage 75 to the valve chamber 71 of the control valve device 13, and also flows through the usual engineer's brake valve device (not shown) to the brake pipe 6, charging said brake pipe. In release position, the chamber 52 of the control valve device is vented through pipe 9 and the application portion of distributing valve device 5, so that the pressure of the spring 69 is permitted to tilt fulcrum plate 50 about the roller 49, through the medium of piston 66 and stem 67, thereby maintaining release valve 86 unseated and the brake cylinders 14 and 8 vented to atmosphere.

When the locomotive and tender move forwardly, the motion is imparted to the cars coupled to the tender through the coupling mechanism, the usual spring action of which permits the coupler 20 initially to be held stationary by the inert cars coupled to the tender, while the draft sills begin moving relatively toward the right hand. Upon movement of the draft key 22 in the horizontal slots into engagement with the draft yoke 21, further movement of the draft sills causes the shock absorbing mechanism 18 to be compressed in the usual well known manner while the cars of the train are set in motion.

During this movement of the parts of the coupling mechanism, the lower end of the pivoted member 40 is maintained in operative engagement with the horn portion 44 of the coupler by the pressure of spring 34 acting on the plunger 33 at the end of operating rod 32, and the lever 47 pivotally joined to the opposite end of said rod is thus swung about pin 46. This movement of lever 47 shifts the roller 49 toward the left hand, relative to the bearing surface of fulcrum plate 50.

It will be noted that, in this position, with the contact point of the roller 49 and the fulcrum plate 50 considered as a fulcrum, the arm 78 forms a lever of greater length than that formed by arm 81.

If, with the train in motion and while the coupling mechanism is under heavy draft as shown in the drawings, it is desired to effect an application of the brakes, a reduction in the pressure of fluid in brake pipe 6 is initiated in the usual well known manner. The distributing valve device 5 thereupon operates in the usual manner to supply fluid under pressure from the main reservoir 7 through the supply pipe 9 to the chamber 52 of the control valve device 13, the further supply of fluid being cut off when the pressure of fluid in said chamber reaches a degree corresponding with the extent the brake pipe pressure is reduced. The pressure of fluid acting upon the piston 62 causes said piston and its stem 63 to move the arm 78 upwardly, thereby rocking the fulcrum member 50 about its contact surface at the roller 49, so that the opposite arm 81 is moved downwardly.

This movement of arm 81 permits the spring 92 to move the release valve and stem 85 downwardly until said valve engages with the seat 93, thereby closing the atmospheric communication. Through the medium of stem 67, the arm 81 also moves the piston 66 against the opposing pressure of spring 69 and into operating engagement with stem 76 of supply valve 72, whereupon the spring 73 is compressed so as to permit said valve to be unseated. Fluid under pressure then flows from the main reservoir through pipe and passage 75 and valve chamber 71, and past the unseated valve 70 to the chamber 56, and thence through passage 58 and pipe 59 to the brake cylinders 14 and 8, effecting an application of the brakes on the tender and locomotive.

When a service reduction in brake pipe pressure is effected as above described, the fluid pressure brake equipment on the cars of the train will operate in the usual well known manner to apply the car brakes.

When the fluid pressure in the brake cylinders and in chamber 56 has been built up to a degree such as to overcome the opposing fluid pressure acting on the piston 62 and dependent upon the relative lengths of the lever arms 81 and 78 as determined by the position of the fulcrum roller 49, the piston 66 will be moved upwardly, together with stem 67 and arm 81, rocking the member 50 about the roller 49 in a clockwise direction, and thereby moving arm 78, stem 63, and piston 62 downwardly. This movement of the piston 66 relieves the valve stem 76 of the operating pressure of said piston, permitting the spring 73 to move the valve 70 into seating engagement with the seat 72, thereby closing the communication from the main reservoir 7 to the brake cylinders.

If, after the above described application of the brakes on the locomotive, the deceleration of the locomotive is at a more rapid rate than that of the cars at the front end of the train, the first car of the train will run in on the rear end of the tender, reducing the slack that was previously stretched out under heavy draft. As the first car runs in, the shock absorbing mechanism 18 on the tender acts, by means of the yoke 21 and draft key 22, to move the coupler 20 inwardly, or toward the right hand, relative to the draft sills 17. At the same time, the coupler horn 44 operates the member 40 to move the rod 32 against the spring 34, causing lever 47 to shift the roller 49 inwardly relative to the bearing surface of member 50, and thus shifting toward the right hand the fulcrum point of the leverage action of said member.

As the turning moment of the arm 78 of member 50 is lessened and that of the opposite arm 81 is lengthened, due to this shifting of the fulcrum roller 49, the pressure of fluid acting on piston 66 is rendered more effective by reason of its leverage advantage, so that said piston is moved upwardly, thereby causing said arm to engage the end of the valve stem 85 and unseat the release valve 86. With the valve 86 unseated, fluid under pressure is vented from the brake cylinders 8 and 14 by way of pipe 59, passage 58, passage 89, valve chamber 87, and past the unseated valve 86 and its fluted stem. When the fluid pressure in the brake cylinders and in the connected chamber 56 has been reduced sufficiently, the bottled up pressure of fluid in the chamber 52 causes the piston 62 to move upwardly and thereby, through the medium of the stem 63 and the member 50 fulcrumed at the roller 49, moves the arm 81 downwardly, permitting the spring 92 to seat the release valve 86.

The partial release of the locomotive and tender brakes just described decreases the retarding action of said brakes, so that harsh running in on the tender by the front car of the train is avoided.

Now when the retarding action of the locomotive and tender brakes is such that the locomotive and tender move or surge forwardly relative to the first car of the train, the coupler 20 is drawn rearwardly relative to the tender, thereby permitting the spring 34 to act through the medium of rod 32 and lever 47 to shift the roller 49 toward the left hand. The member 50 is then rocked about the roller 49 in a counterclockwise direction by the pressure of fluid on the piston 62 acting through the increased leverage of the arm 78, and the arm 81 then moves the stem 67 and piston 66 downwardly, causing said piston to engage the stem 76 and unseat the valve 70. With the supply valve again unseated, fluid under pressure is again supplied from the main reservoir 7 to the brake cylinders 14 and 8, thereby increasing brake cylinder pressure. The resulting increased deceleration of locomotive and tender will tend to restore a proper degree of slack action between the tender and the front car of the train.

To release the brakes after an application has been effected, the brake pipe 6 is charged with fluid under pressure in the customary manner, and the distributing valve device 5 is thereby operated in the usual well known manner to establish communication from the supply pipe 9 to atmosphere, thus venting the chamber 52 of the control valve device 13 by way of said pipe and through said distributing valve. With the chamber 52 relieved of fluid under pressure, the pressure of fluid in chamber 56 and of the spring 69 acts on the piston 66 to move said piston, stem 67, and arm 81 upwardly, tilting the member 50 about the roller 49 and causing said arm to engage the valve stem 85 and thereby to unseat the release valve 86. Fluid under pressure then flows from the brake cylinders 8 and 14 through pipe 59, passages 58 and 89, valve chamber 87, and past the unseated valve 86 and fluted stem 85 to the atmosphere, thus releasing the brakes on the locomotive and tender.

Upon the charging of the brake pipe 6, the brake equipments on the cars will function in the usual manner to release the car brakes.

In Fig. 3 of the drawings, a modification of the invention is illustrated diagrammatically, in which a control valve device 126 is provided. Said control valve device is adapted to be mounted upon the locomotive and the adjustment of the control valve device is adapted to be effected by electrically controlled means according to the relative longitudinal movement between the first car of the train and the rear end of the tender.

As shown in Fig. 3, the electrical means comprises a magnet device 101, mounted on the locomotive and comprising a solenoid winding 102, an armature 103, and an armature stem 104. One terminal of the winding is connected to a switch contact 98 of a switch device 201 to be hereinafter more fully described. The other switch contact 99 of said switch device is connected to one terminal of a battery 100 or other source of current. The other terminal of the winding 102 is connected to one terminal of a rheostat device or variable resistance, which may be located on the tender and comprises resistance elements 105 adapted to be connected through a sliding contact member 108, the other rheostat terminal being connected to the opposite battery terminal to complete the circuit. The contact member 108 is secured to the inner end of the rod 32 corresponding with the rod 32 of the construction shown in Fig. 1, there being an insulating block 109 interposed between said rod and contact member.

The lower end of the armature stem 104 of magnet device 101 is enlarged and extends through and is clamped to a flexible diaphragm 106 by means of the annular nut 107, said diaphragm forming on one side a chamber 110, open to atmosphere through a passage 113, and on the opposite side a chamber 111. The enlarged portion of the armature stem 104 has a central bore 112, connected by way of a transverse passage 114 to chamber 110, and having a communication with the chamber 111 normally closed by an exhaust valve 115, which is adapted to engage a seat carried by said enlarged portion. The stem of valve 115 has a fluted portion 117 extending through a suitable bore into a supply chamber 118, which is connected through a passage and pipe 119 to the main reservoir 7, and a normally open supply valve 121 is formed at the lower end of said fluted portion, adapted to control communication between chambers 118 and 111. A spring 122 is disposed in chamber 118 between valve 121 and a cap nut 123 for urging said valve, stem 117, and valve 115 upwardly.

Contained in the chamber 110 and interposed between and engaging the casing and the enlarged portion of armature stem 104 is a spring 125, which acts normally to maintain the exhaust valve closed and the supply valve 121 open against the opposing pressure of the spring 122.

The control valve device 126 may be mounted on the locomotive as shown in the drawings, and although operatively similar to the control valve device 13 shown in Fig. 1, embodies a construction somewhat different from that of said control valve device 13. This control valve device comprises a casing having a bore containing a piston 128, on one side of which is a chamber 130 connected through a pipe 131 to the chamber 111 of the magnet device 101. A rod 132 is provided, one end of which passes through and is secured by a nut 133 to piston 128, and the opposite end of which carries a fulcrum roller 135, disposed between the casing and a bearing face of a fulcrum plate 138. A spring 139 is interposed between piston 128 and a wall 136 of the bore for urging said piston, the rod 132, and roller 135 toward the right hand.

The fulcrum plate 138 is horizontally disposed in the casing of the control valve device and has oppositely extending arms 141 and 142. The arm 141 has a recess 143 adapted operatively to receive the end of a piston stem 144, which passes through an opening in a cap plate 146 into a bore containing a flanged piston 147, which is secured to said stem between a collar 151 and a nut 152. Similarly, the arm 142 has a recess 154 adapted operatively to receive the end of a piston stem 156, which extends through an opening in a cap plate 158 into a bore containing a flanged piston 160, mounted to the stem between a collar 161 and a nut 162. The piston 160 has at its lower side a chamber 185, connected through a passage 186 to a chamber 187, which in turn is connected to the supply pipe 9 of the distributing valve device 5. The piston 147 forms a chamber 164 which contains a spring 165 interposed between the piston and the chamber wall for urging said piston, the piston stem 144, and arm 141 upwardly.

Chamber 164 is connected through a passage 166 to a passage 167 leading from the brake cylinder pipe 59 to a valve chamber 168, containing a release valve 171, the fluted stem 172 of which is normally engaged by arm 141 to hold said valve unseated against the pressure of a spring 173.

Disposed in a valve chamber 175, connected through a passage and pipe 174 to main reservoir 7 is a supply valve 176, having a fluted stem 177 passing through a suitable bore connecting chambers 175 and 164, and adapted to be operatively engaged by a plunger 179 secured to and extending from the center of piston 147. A spring 181 is provided in chamber 175 between valve 176 and a cap nut 182, and acts against said valve for urging it to its seat.

For controlling the electric circuit through the solenoid winding 102, battery 100, and resistance elements 105, a switch device, adapted to connect the switch contacts 98 and 99, is provided in the control valve device 126. Disposed in a bore adjacent the chamber 187 is a switch piston 188, the lower side of which is adapted to engage a seat rib 190, so as to permit an inner seated area of the piston to be subject to the fluid pressure in chamber 187. The outer seated area of the piston 188 is open through a passage 192 to a chamber 193 at the opposite side of the switch piston, which is adapted to close said passage upon upward movement, and a cap plate 194 is provided for closing the outer end of said chamber.

A stem 196 having a collar 197 and adjacent screw-threaded end passing through an opening in piston 188 and secured thereto by a nut 198, extends through a suitable bore in a cap plate 194, and carries a contact member 200. The contact member is adapted to bridge the switch contacts 98 and 99 when the switch piston is moved upwardly, a spring 203 being interposed between the cap plate 194 and said piston for urging the piston, stem 196, and member 200 downwardly, thereby normally maintaining open the circuit through the battery 100, solenoid winding 102, and resistance elements 105.

When, in effecting an application of the brakes, fluid under pressure is supplied to the pipe 9 by operation of the distributing valve device 5, fluid under pressure flows from said pipe to the chamber 187, and acts upon the inner seated area of piston 188 to move said piston from its seat. When the piston is unseated, the full area of the piston is subjected to fluid pressure, so that the piston is moved upwardly with a quick snap-like action, causing the member 200 to bridge the contacts 98 and 99. Thus the circuit through the battery 100, solenoid winding 102 and resistance element 105 is closed.

Now if the tender coupling mechanism is subjected to draft strain, the coupler 20 will be in the position shown, and with the coupler in this position, the contact member 108 will be in its extreme outer position in which maximum resistance is cut in the magnet circuit. With the maximum resistance thus cut in, the winding 102 will be energized, but not sufficiently to move the diaphragm 106 against the opposing pressure of the spring 125, which is thus permitted to maintain exhaust valve 115 closed and supply valve 121 open. Fluid under pressure from the main reservoir 7 is supplied through pipe and passage 119, chamber 118, past valve 121 and stem 117, through chamber 111 and pipe 131 to the chamber 130, acting on the piston 128 to move said piston, rod 132 and the roller 135 to the left.

Fluid under pressure supplied to the chamber 187 flows to the chamber 185, and causes the piston 160 and stem 156 to move upwardly, thereby rocking the fulcrum plate 138 about the roller 135 so as to permit the release valve 171 to seat and then to open the supply valve 176. Fluid under pressure then flows from the main reservoir 7 through pipe and passage 174, valve chamber 175, past the unseated valve to chamber 164, and thence through passage 166 and pipe 59 to the brake cylinders 8 and 14, a relatively high build-up of fluid pressure being reached before the piston 147 is moved upwardly to lap position against the opposing force of the piston 160 acting through the medium of the fulcrum plate 138.

If, however, the coupler 20 is moved inwardly due to deceleration of the locomotive, the contact members 108 will be shifted to cut out some of the resistance in the circuit, so that the magnetic pull on the armature 103, and consequently on the stem 104 and diaphragm 106, is increased, causing them to move upwardly. The consequent seating of the valve 121 and unseating of the valve 115 permits fluid under pressure in the chamber 130 to be vented to atmosphere by way of pipe 131, chamber 111, bore 112, passage 114, chamber 110, and passage 113. The spring 139 then moves the piston 128, rod 132, and roller 135 toward the right hand. thus changing the leverage ratio of the arms 141 and 142 of the fulcrum plate 138, permitting the piston 147 to be moved so as to unseat the release valve 171 through the medium of the stem 144, arm 141, and valve stem 172.

If, when fluid under pressure is thus released from brake cylinders 14 and 8, the locomotive and tender should again move forwardly relative to the first car of the train, more resistance will be cut in circuit and the magnetic pull on the armature 103 will be decreased, with the result that fluid under pressure will again be supplied to said brake cylinders. It will thus be seen that the control valve device 126 is adjusted electrically according to the relative longitudinal movement between the first car of the train and the tender.

When, in releasing the brakes on the train, fluid under pressure is vented from the pipe 9 and consequently from the chambers 187 and 185, the spring 203 acts to move the piston 188 downwardly, causing disengagement of the contact member 200 and switch contacts 98 and 99 and thereby breaking the circuit through the winding 102. The pressure of the spring 125 then moves the armature 103, stem 104, and diaphragm 106 so as to close the exhaust valve 115. At the same time, the release of fluid under pressure from the chamber 185 in the control valve device permits the piston 160 and stem 156 to move downwardly under pressure of fluid and of the spring 165 acting through the medium of the piston 147, stem 144, and fulcrum arm 138. The consequent unseating of the release valve 171 by engagement of the arm 141 with the stem 172 permits fluid under pressure in the brake cylinders 8 and 14 to be vented to atmosphere, effecting a release of the brakes.

It is evident from the foregoing description that when a reduction in the pressure of fluid is initiated in the locomotive of a train in effecting an application of the brakes of the train, the control valve device operates in accordance with relative longitudinal movement between the first car of the train and the tender, so as to effect such variations in the pressure of fluid in the brake cylinders of the locomotive and tender as will prevent said locomotive and tender from causing run-in and run-out shocks on the cars of the train.

It should be understood that, although I have described my equipment as being carried by a locomotive and tender, it is not my intention thereby to limit the scope of the invention, for it will be evident that the same equipment may be carried by any other train power unit not having a tender, such as an electric locomotive or Diesel motor locomotive.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake applied to a vehicle of a train, in combination, a brake cylinder, means operative according to the opposing pressures of the brake cylinder and a chamber for controlling the supply of fluid under pressure to the brake cylinder and including a fulcrumed lever through which the pressure of the chamber is transmitted to oppose the brake cylinder pressure, and a movable fulcrum member movable to vary the lever ratio of said lever, and means for shifting said fulcrum member according to the movement of said vehicle relative to another vehicle in the train.

2. In a fluid pressure brake applied to a vehicle of a train, in combination, a brake cylinder, means operative according to the opposing pressures of the brake cylinder and a chamber for controlling the supply of fluid under pressure to the brake cylinder and including a fulcrumed lever through which the pressure of the chamber is transmitted to oppose the brake cylinder pressure, a movable fulcrum member movable to vary the lever ratio of said lever, a movable abutment operative according to the degree of fluid pressure supplied thereto for shifting said fulcrum member, and means operated according to the movement of said vehicle relative to another vehicle in the train for varying the fluid pressure on said abutment.

3. In a fluid pressure brake applied to a vehicle of a train, in combination, a brake cylinder, means operative according to the opposing pressures of the brake cylinder and a chamber for controlling the supply of fluid under pressure to the brake cylinder and including a fulcrumed lever through which the pressure of the chamber is transmitted to oppose the brake cylinder pressure, a movable fulcrum member movable to vary the lever ratio of said lever, a movable abutment operative according to the degree of fluid pressure supplied thereto for shifting said fulcrum member, and electrically controlled means for varying the fluid pressure on said abutment according to the movement of said vehicle relative to another vehicle in the train.

4. In a fluid pressure brake applied to a vehicle of a train, in combination, a brake cylinder, a movable abutment subject to brake cylinder pressure, a movable abutment subject to the fluid pressure supplied to a chamber, a fulcrumed lever operatively connecting said abutments whereby the brake cylinder pressure opposes the fluid pressure in said chamber, valve means operated by said abutments for supplying fluid under pressure to the brake cylinder, a movable fulcrum member for said lever, and means operated according to the movement of said vehicle relative to another vehicle in the train for shifting said fulcrum member.

5. In a fluid pressure brake applied to a vehicle of a train, in combination, a brake cylinder, a movable abutment subject to brake cylinder pressure, a movable abutment subject to the fluid pressure supplied to a chamber, a fulcrumed lever operatively connecting said abutments whereby the brake cylinder pressure opposes the fluid pressure in said chamber, valve means operated by said abutments for supplying fluid under pressure to the brake cylinder, a movable fulcrum member for said lever, means for varying the fluid pressure in said chamber, and means operative according to the movement of said vehicle relative to another vehicle in the train for shifting said fulcrum member.

6. In a fluid pressure brake applied to a vehicle of a train, in combination, a brake cylinder, means operative according to the opposing pressures of the brake cylinder and a chamber for controlling the pressure of fluid in the brake cylinder, including a fulcrumed lever through which the pressure of the chamber is transmitted to oppose the brake cylinder pressure, valve means operative by the lever according to variations in the pressures in said chamber and the brake cylinder, said valve means having brake cylinder supply, lap, and brake cylinder release positions, and a movable fulcrum member movable to vary the lever ratio of said lever, and means for shifting said fulcrum member according to the movement of said vehicle relative to another vehicle in the train.

7. In a fluid pressure brake, applied to a vehicle of a train, in combination, a brake cylinder, valve means for controlling the supply and release of fluid under pressure to and from the brake cylinder, a movable abutment subject to brake cylinder pressure for operating said valve means, a movable abutment subject to the fluid pressure supplied to a chamber, a fulcrumed lever operatively connected to said abutments for transmitting the pressure of fluid in said chamber to oppose brake cylinder pressure, a movable fulcrum member for said lever, and means for shifting said fulcrum member according to the movement of said vehicle relative to another vehicle in the train.

8. In a fluid pressure brake, applied to a vehicle of a train, in combination, a brake cylinder, a brake cylinder release valve, a brake cylinder supply valve, a movable abutment subject to brake cylinder pressure for operating said valves, a movable abutment subject to the pressure of fluid supplied to a chamber, a fulcrumed lever operatively connecting said abutments whereby the brake cylinder pressure opposes the fluid pressure in said chamber, a movable fulcrum member for said lever, and means for shifting said fulcrum member according to the movement of said vehicle relative to another vehicle in the train.

9. In a fluid pressure brake, applied to a vehicle of a train, in combination, a brake cylinder, a brake cylinder release valve, a brake cylinder supply valve, a movable abutment subject to brake cylinder pressure and having a stem, a fulcrumed lever having one end interposed between said stem and one of said valves, a movable abutment operatively connected to the other end of said lever and subject to the pressure of fluid supplied to a chamber, a movable fulcrum member adapted to engage the lever intermediate said abutments, and means for shifting said fulcrum member according to the movement of said vehicle relative to another vehicle in the train.

10. In a fluid pressure brake applied to a vehicle of a train, in combination, a brake cylinder, a brake cylinder supply valve, a brake cylinder release valve, a movable abutment subject to brake cylinder pressure and operatively aligned with the brake cylinder supply valve, biasing means for said abutment whereby it is normally urged in spaced relation to said supply valve and in unseating engagement with said release valve, a fulcrumed lever having one end interposed between said abutment and said release valve, a movable abutment operatively connected to the other end of said lever and subject to the pressure of fluid supplied to a chamber, a movable fulcrum member movable to vary the lever ratio of said lever, and means for shifting said fulcrum member according to the movement of said vehicle relative to another vehicle in the train.

11. In a fluid pressure brake applied to a vehicle of a train, in combination, a brake cylinder, a brake cylinder supply valve, a brake cylinder release valve, a movable abutment subject to brake cylinder pressure and having a stem operatively aligned with said valves, a spring operative upon said abutment for urging the stem in unseating engagement with said release valve and away from said supply valve, a movable abutment subject to the pressure of fluid supplied to a chamber, a fulcrumed lever operatively connecting said abutments whereby the fluid pressure in said chamber opposes said spring, a movable fulcrum member for said lever, and means operated according to the movement of said vehicle relative to another vehicle in the train for shifting said fulcrum member.

12. In a fluid pressure brake applied to a vehicle of a train, in combination, a brake cylinder, a control valve device comprising a movable abutment subject to brake cylinder pressure, a movable abutment subject to the fluid pressure supplied to a chamber, a fulcrumed lever operatively connected to said abutments for transmitting the pressure of fluid in said chamber to oppose brake cylinder pressure, a brake cylinder release valve, a brake cylinder supply valve, said valves having stems operatively aligned with one of said abutments and so spaced as always to close one or the other of said valves, and a movable fulcrum member for said lever, and means for shifting said fulcrum member according to the movement of said vehicle relative to another vehicle in the train.

CLYDE C. FARMER.